United States Patent
Savchenko

(10) Patent No.: US 11,222,196 B2
(45) Date of Patent: Jan. 11, 2022

(54) SIMULTANEOUS RECOGNITION OF FACIAL ATTRIBUTES AND IDENTITY IN ORGANIZING PHOTO ALBUMS

(71) Applicant: Samsung Electronics Co., Ltd., Suwon-si (KR)

(72) Inventor: Andrey Vladimirovich Savchenko, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/504,802

(22) Filed: Jul. 8, 2019

(65) Prior Publication Data

US 2020/0019759 A1 Jan. 16, 2020

(30) Foreign Application Priority Data

Jul. 11, 2018 (RU) .............. RU2018125429
Dec. 6, 2018 (RU) .............. RU2018143163
Apr. 12, 2019 (KR) .......... 10-2019-0043216

(51) Int. Cl.
 *G06K 9/00* (2006.01)
 *G06N 3/08* (2006.01)
 *G06F 16/45* (2019.01)

(52) U.S. Cl.
 CPC ......... *G06K 9/00288* (2013.01); *G06F 16/45* (2019.01); *G06K 9/00281* (2013.01); *G06N 3/08* (2013.01)

(58) Field of Classification Search
 CPC ....... G06F 16/45; G06K 9/00281; G06N 3/08
 See application file for complete search history.

(56) References Cited

U.S. PATENT DOCUMENTS

| 10,235,603 B2 | 3/2019 | Zhang et al. | |
| 2003/0007669 A1* | 1/2003 | Martinez | G06K 9/00288 382/118 |
| 2009/0097711 A1* | 4/2009 | Chen | G06K 9/00375 382/103 |

(Continued)

FOREIGN PATENT DOCUMENTS

| CN | 107292267 A | 10/2017 |
| KR | 10-2016-0061856 A | 6/2016 |

(Continued)

OTHER PUBLICATIONS

Hu et al, "An improved dropout method and its application into DBN-based handwriting recognition", Jul. 2017, Chinese Control Conference (CCC) (pp. 11145-11149) (Year: 2017).*

(Continued)

*Primary Examiner* — Edward Park
(74) *Attorney, Agent, or Firm* — Jefferson IP Law, LLP

(57) ABSTRACT

A method is provided for simultaneously recognizing facial attributes and identity to organize photo and/or video albums, based on modifying an efficient convolutional neural network (CNN) which extracts facial representations suitable for face identification and attribute (age, gender, ethnicity, emotion, etc.) recognition tasks. The method enables to process all the tasks simultaneously, without a need for additional CNNs. As a result, a very fast facial analytic system is provided, and the system can be installed onto mobile devices.

20 Claims, 8 Drawing Sheets

(56) References Cited

U.S. PATENT DOCUMENTS

| | | | |
|---|---|---|---|
| 2011/0194779 A1* | 8/2011 | Zhong | G06K 9/00288 382/218 |
| 2011/0222724 A1 | 9/2011 | Yang et al. | |
| 2012/0233159 A1* | 9/2012 | Datta | G06F 16/532 707/728 |
| 2014/0050404 A1* | 2/2014 | Solem | G06K 9/00281 382/190 |
| 2015/0139485 A1 | 5/2015 | Bourdev | |
| 2016/0275341 A1* | 9/2016 | Li | G06K 9/4642 |
| 2017/0032224 A1 | 2/2017 | Zhang et al. | |
| 2017/0098122 A1* | 4/2017 | el Kaliouby | G16H 50/30 |
| 2017/0098152 A1* | 4/2017 | Kerr | G06F 16/583 |
| 2018/0032866 A1 | 2/2018 | Son et al. | |
| 2020/0019759 A1* | 1/2020 | Savchenko | G06N 3/0454 |

FOREIGN PATENT DOCUMENTS

| | | |
|---|---|---|
| RU | 2 279 132 C2 | 6/2006 |
| RU | 115 098 U1 | 4/2012 |
| RU | 2 566 979 C1 | 10/2015 |
| RU | 2 622 874 C1 | 6/2017 |
| WO | 2005/024718 A1 | 3/2005 |

OTHER PUBLICATIONS

Manju, A., Valarmathie, P.: Organizing multimedia big data using semantic based video content extraction technique. In: Soft-Computing and Networks Security (ICSNS), 2015; International Conference on, IEEE (2015) 1-4.

Sokolova, A.D., Kharchevnikova, A.S., Savchenko, A.V.: Organizing multimedia data in video surveillance systems based on face verification with convolutional neural networks. In: International Conference on Analysis of Images, Social Networks and Texts, Springer (2017) 223-230.

Zhang, Y.J., Lu, H.: A hierarchical organization scheme for video data. Pattern Recognition 35(11) (2002) 2381-2387.

He, Y., Cao, K., Li, C., Loy, C.C.: Merge or not? Learning to group faces via imitation learning. arXiv preprint arXiv:1707.03986 (2017).

Eidinger, E., Enbar, R., Hassner, T.: Age and gender estimation of unfiltered faces. IEEE; Transactions on Information Forensics and Security 9(12) (2014) 2170-2179.

Rothe, R., Timofte, R., Van Gool, L.: DEX: Deep expectation of apparent age from a single image. In: Proceedings of the IEEE; International Conference on Computer Vision Workshops. (2015) 10-15.

Goodfellow, I., Bengio, Y., Courville, A.: Deep learning. MIT press (2016).

Crosswhite, N., Byrne, J., Stauffer, C., Parkhi, O., Cao, Q., Zisserman, A.: Template adaptation for face verification and identification. In: Automatic Face & Gesture Recognition (FG 2017), 2017 12th IEEE; International Conference on, IEEE (2017) 1-8.

Wang, F., Cheng, J., Liu, W., Liu, H.: Additive margin softmax for face verification. IEEE; Signal Processing Letters 25(7) (2018) 926-930.

Savchenko, A.V., Belova, N.S.: Unconstrained face identification using maximum likelihood of distances between deep off-the-shelf features. Expert Systems with Applications 108 (2018) 170-182.

Ranjan, R., Patel, V.M., Chellappa, R.: Hyperface: A deep multi-task learning framework for face detection, landmark localization, pose estimation, and gender recognition. IEEE; Transactions on Pattern Analysis and Machine Intelligence (2017).

Howard, A.G., Zhu, M., Chen, B., Kalenichenko, D., Wang, W., Weyand, T., An-dreetto, M., Adam, H.: MobileNets: Efficient convolutional neural networks for mobile vision applications. arXiv preprint arXiv:1704.04861 (2017).

Cao, Q., Shen, L., Xie, W., Parkhi, O.M., Zisserman, A.: VGGFace2: A dataset for recognising faces across pose and age. In: Automatic Face & Gesture Recognition (FG 2018), 2018 13th IEEE International Conference on, IEEE (2018) 67-74.

Zhang, K., Zhang, Z., Li, Z., Qiao, Y.: Joint face detection and alignment using multitask cascaded convolutional networks. IEEE Signal Processing Letters 23(10) (2016) 1499-1503.

Aggarwal, C.C., Reddy, C.K.: Data clustering: algorithms and applications. CRC press (2013).

Parkhi, O.M., Vedaldi, A., Zisserman, A., et al.: Deep face recognition. In: BMVC. vol. 1. (2015) 6.

Kaya, H., Gurpinar, F., Salah, A.A.: Video-based emotion recognition in the wild using deep transfer learning and score fusion. Image and Vision Computing 65 (2017) 66-75.

Rassadin, A., Gruzdev, A., Savchenko, A.: Group-level emotion recognition using transfer learning from face identification. In: Proceedings of the 19th ACM International Conference on Multimodal Interaction, ACM (2017) 544-548.

Kittler, J., Hatef, M., Duin, R.P., Matas, J.: On combining classifiers. IEEE; Transactions on Pattern Analysis and Machine Intelligence 20(3) (1998) 226-239.

Zhu, C., Wen, F., Sun, J.: A rank-order distance based clustering algorithm for face tagging. In: Computer Vision and Pattern Recognition (CVPR), 2011 IEEE Conference on, IEEE (2011) 481-488.

Zhang, Z., Luo, P., Loy, C.C., Tang, X.: Joint face representation adaptation and clustering in videos. In: European conference on computer vision, Springer (2016) 236-251.

Learned-Miller, E., Huang, G.B., RoyChowdhury, A., Li, H., Hua, G.: Labeled faces in the wild: A survey. In: Advances in face detection and facial image analysis. Springer (2016) 189-248.

Best-Rowden, L., Han, H., Otto, C., Klare, B.F., Jain, A.K.: Unconstrained face recognition:Identifying a person of interest from a media collection. IEEE Transactions on Information Forensics and Security 9(12) (2014) 2144-2157.

Gallagher, A.C., Chen, T.: Clothing cosegmentation for recognizing people. In: Computer Vision and Pattern Recognition, 2008. CVPR 2008. IEEE Conference on, IEEE (2008) 1-8.

Levi, G., Hassner, T.: Age and gender classification using convolutional neural networks. In: Proceedings of the IEEE Conference on Computer Vision and Pattern Recognition Workshops. (2015) 34-42.

Min, R., Kose, N., Dugelay, J.L.: Kinectfacedb: A Kinect database for face recognition. IEEE Transactions on Systems, Man, and Cybernetics: Systems 44(11) (2014) 1534-1548.

Setty, S., Husain, M., Beham, P., Gudavalli, J., Kandasamy, M., Vaddi, R., Hemadri, V., Karure, J., Raju, R., Rajan, B., et al.: Indian movie face database: a benchmark for face recognition under wide variations. In: Fourth National Conference on Computer Vision, Pattern Recognition, Image Processing and Graphics (NCVPRIPG), IEEE (2013) 1-5.

Klare, B.F., Klein, B., Taborsky, E., Blanton, A., Cheney, J., Allen, K., Grother, P., Mah, A., Jain, A.K.: Pushing the frontiers of unconstrained face detection and recognition: Iarpa janus benchmark a. In: Proceedings of the IEEE Conference on Computer Vision and Pattern Recognition. (2015) 1931-1939.

Dhall, A., et al.: Collecting large, richly annotated facial-expression databases from movies. IEEE Multimedia (2012).

Zhu, P., Zhang, L., Zuo, W., Zhang, D.: From point to set: Extend the learning of distance metrics. In: Proceedings of the International Conference on Computer Vision (ICCV), IEEE (2013) 2664-2671.

Miech, A., Laptev, I., Sivic, J.: Learnable pooling with context gating for video classification. arXiv preprint arXiv:1706.06905 (2017).

Yang, J., Ren, P., Chen, D., Wen, F., Li, H., Hua, G.: Neural aggregation network for video face recognition. In: Proceedings of the International Conference on Computer Vision and Pattern Recognition (CVPR), IEEE (2017) 4362-4371.

Russian Office Action dated Sep. 2, 2019, issued in Russian Patent Application No. 2018143163.

* cited by examiner photo 4 out of 95
latitude=0,000 longitude=0,000 no objects found
scenes:bookstore (0,45);
age=29 male
text:24th INTERNATIONAL CONFERENCE ON
PATTERN RECOGNITION

SIMULTANEOUS RECOGNITION OF FACIAL ATTRIBUTES AND IDENTITY IN ORGANIZING PHOTO ALBUMS

CROSS-REFERENCE TO RELATED APPLICATION(S)

This application is based on and claims priority under 35 U.S.C. § 119 of a Russian patent application number 2018125429, filed on Jul. 11, 2018, in the Russian Intellectual Property Office, of a Russian patent application number 2018143163, filed on Dec. 6, 2018, in the Russian Intellectual Property Office, and of a Korean patent application number 10-2019-0043216, filed on Apr. 12, 2019, in the Korean Intellectual Property Office, the disclosure of each of which is incorporated by reference herein in its entirety.

BACKGROUND

1. Field

The disclosure relates to an electronic apparatus for recognizing the identity and attributes of a face included in an image and more particularly, to an electronic apparatus capable of recognizing both the identity and attributes of a face using a single convolutional neural network (CNN).

2. Description of Related Art

Nowadays, due to the extreme increase in multimedia resources, there is an urgent need to develop intelligent methods to process and organize them [1]. For example, the task of automatically organizing photo and video albums attracts increasing attention [2, 3]. Various systems for organizing photos enable users to group and tag photos and videos in order to retrieve large number of images in a media library [4]. The most typical processing of a gallery includes grouping (clustering) faces, and each group can be automatically tagged with facial attributes, such as age (year of birth, YoB) and gender [5]. Hence, a typical problem can be formulated as follows: given a large number of unlabeled facial images, cluster the images into individual persons (identities) [4] and predict age and gender of each person [6].

This problem is usually solved using deep convolutional neural networks (CNNs) [7]. At first, clustering of photos and videos that contain the same person is performed using known face verification [8, 9] and identification [10] methods. Facial attributes (age, gender, race, emotions) of the extracted faces can be recognized by other CNNs [5, 6]. Though such approach works rather well, it requires at least three different CNNs, which increases processing time, especially if the gallery should be organized on mobile platforms in offline mode. Moreover, every CNN learns its own face representation whose quality can be limited by small size of a training set or by noise in training data. The latter issue is especially crucial for age prediction where ground-truth values of age are usually incorrect.

It should be rather obvious that closeness among the facial processing tasks can be employed in order to learn efficient face representations which boost up their individual performances. For instance, simultaneous face detection, landmark localization, pose estimation, and gender recognition is implemented in [11] by a single CNN.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to improve efficiency in facial clustering and face attribute recognition by learning face representations with preliminarily training on a domain of unconstrained face identification from a very large database. The disclosure provides a multi-output extension of a convolutional neural network (CNN) with low inference and memory complexity, e.g. MobileNet [12], which is pre-trained to perform face recognition using the VGGFace2 dataset [13]. Additional layers of the network are fine-tuned for facial attribute recognition using e.g. the Audience [5] and IMDB-Wiki [6] datasets. Finally, a novel approach to grouping faces is provided. Said approach deals with several challenges of processing real-world photo and video albums.

Another aspect of the disclosure is to provide automatic extraction of persons and their attributes (gender, year of birth, ethnicity, emotions) from an album of photos and videos. The inventors propose a two-stage approach in which, first, a CNN simultaneously predicts facial attributes from all photos, and additionally extracts facial representations suitable for face identification. An efficient CNN is preliminarily trained to perform face recognition, in order to additionally recognize age and gender. In the second stage of the approach, the extracted faces are grouped by using hierarchical agglomerative clustering techniques. Year of birth and gender of a person in each cluster are estimated by using an aggregation of predictions for individual photos. The quality of facial clustering provided by the disclosure is competitive with existing neural networks, though in implementation the inventive approach is much computationally cheaper. Moreover, said approach is characterized by more accurate video-based facial attribute recognition, as compared to publicly available models.

Additional aspects will be set forth in part in the description which follows and, in part, will be apparent from the description, or may be learned by practice of the presented embodiments.

In accordance with an aspect of the disclosure, a computer-implemented method is provided for simultaneously recognizing facial attributes (e.g. one or more of age, gender, race or ethnicity, or emotions) and identity in digital images. Said method comprises: training a basic CNN on a pre-existing set of plural images, modifying the CNN by providing at least one hidden layer with dropout regularization, providing, over the at least one hidden layer, independent fully-connected layers for recognizing facial attributes, each one of said independent layers corresponding to a respective one of the facial attributes and having a respective nonlinearity, training the independent fully-connected layers, said training comprising alternately using a batch of training data specific only to one of said independent layers that is being trained, extracting, by layers of the basic CNN from at least parts of one or more input images, facial identity features suitable for face identification, providing, by the at least hidden layer using the extracted facial identity features, input for the independent fully-connected layers, and recognizing the facial attributes respectively by the independent fully-connected layers based on the input from the at least one hidden layer.

The basic CNN is preferably a CNN with low inference and memory complexity (e.g. MobileNet v1/v2).

Each batch of training data preferably has a respective label indicative of a particular facial attribute which the batch is specific to.

The method may further comprise: detecting, in the one or more input images, regions associated with faces and using the regions as said at least parts of the one or more input images. The detecting is preferably performed by a multi-view cascade classifier or by a multi-task cascaded convolutional neural network (MTCNN) detector.

In accordance with another aspect of the disclosure, a computer-implemented method is provided for organizing a digital photo album and/or a digital video album, the photo album including a plurality of photos, the video album including a plurality of video clips. Said method comprises the operations of selecting multiple frames in each video clip from the plurality of video clips, detecting, in each of the selected frames and/or in each photo from the plurality of photos, regions associated with faces, extracting facial identity features and facial attributes of all the faces using the method according to the first aspect of the disclosure, where the detected regions are used as the input images, for each video clip in the plurality of video clips, clustering extracted facial identity features and facial attributes associated with each face among faces detected in the video clip into a single cluster, and computing mean facial identity features and mean facial attributes for each cluster of the video clip, and grouping the photos and/or the video clips by jointly clustering the facial identity features extracted from the photos and the mean facial identity features computed for the video clips, and based on at least one averaged facial attribute computed, for each cluster, from respective facial attributes and/or mean facial attributes associated with the cluster.

The detecting is preferably performed by a multi-view cascade classifier or by a MTCNN detector. The selecting preferably comprises selecting distinct frames of the video clip with fixed frame rate. The at least one averaged facial attribute is preferably computed by using an appropriate fusion technique, such as simple voting or maximizing average posterior probabilities at outputs of the CNN. The computing mean identity features preferably comprises computing a normalized average of the extracted identity features.

The jointly clustering is preferably performed by using hierarchical agglomerative clustering to obtain clusters each including facial identity features of one or more faces. The jointly clustering preferably comprises refining the clusters in such a way that inappropriate clusters are filtered out. The inappropriate clusters may refer to clusters with a number of elements less than a first predetermined threshold value, or clusters associated with photos/video clips whose capturing dates differ less than a second predetermined threshold value.

The method may further comprise, prior to the operation of jointly clustering estimating a year of birth relating to each of the faces by subtracting age in facial attributes associated with the face from a creation date of a file containing a photo or a video clip in which said face has been detected. In such a case, the jointly clustering preferably comprises preventing facial identity features of persons, whose years of birth differ more than a predefined threshold, from being clustered into a same cluster.

The method may further comprise displaying the grouped photos and/or video clips along with respective averaged facial attributes.

In accordance with another aspect of the disclosure, a computing device is provided. The computing device includes at least one processor and memory capable of having computer-executable instructions stored therein, the computer-executable instructions, when executed by the at least processor, cause the computing device to perform the method according to the second aspect of the disclosure.

In accordance with another aspect of the disclosure, a computer-readable storage medium having computer-executable instructions stored therein is provided. The executable instructions, when executed by a computing device, cause the computing device to perform the method according to the second aspect of the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
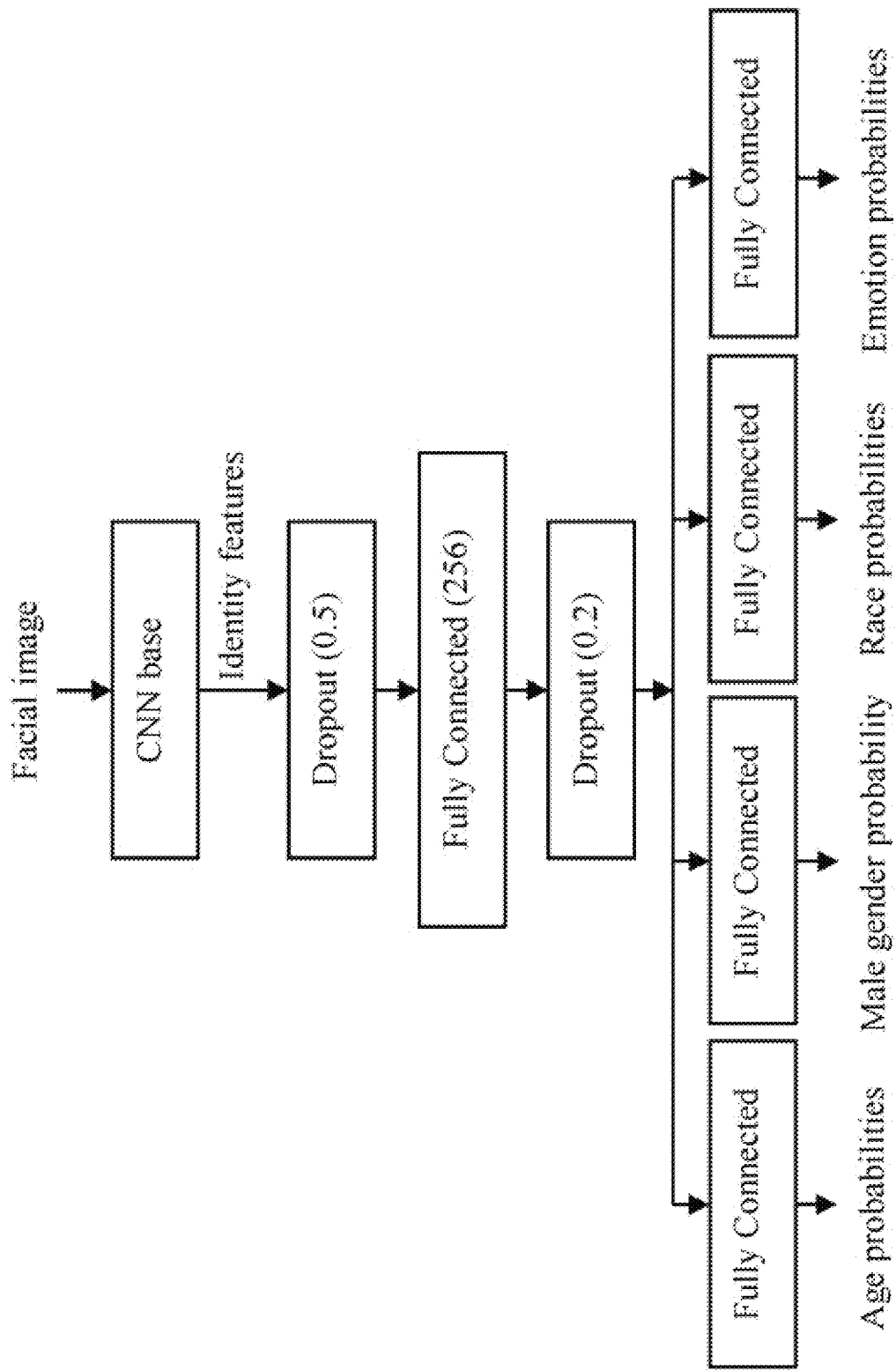
FIG. 1 is a view schematically depicting a multi-output convolutional neural network (CNN) suitable for simultaneous recognition of facial attributes and identity according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Multi-Output CNN for Simultaneous Age, Gender and Identity Recognition

The disclosure is provided to solve several different facial analytic tasks. Facial regions are obtained in each digital image using any appropriate face detector, e.g. either the conventional multi-view cascade Viola-Jones classifier or more accurate CNN-based methods [14]. The gender recognition task is a binary classification problem in which the obtained facial image is assigned to one of two classes (male and female). Emotion recognition is a multi-class classification task with three classes (positive, negative, neutral) or seven types of basic emotions (angry, disgust, fear, happy, sad, surprise, neutral). Race (ethnicity) recognition is also a multi-class classification problem with such classes as White, Black, Asian, Indian, Hispanic, Latino, Middle Eastern, etc. Age prediction is a special case of regression task, though sometimes it is considered as a multi-class classification with, e.g. N=100 different classes, so that it is required to predict whether an observed person is 1, 2, . . . , or 100 years old [6]. In such case these tasks become very similar and can be solved by conventional deep learning techniques. Namely, a large facial dataset of persons with known facial attributes is gathered, e.g. IMDB-Wiki [6] or UTKFace. After that a deep CNN is learned to solve the classification task. The resultant networks can be applied to predict age and gender given a new facial image.

Another problem is that unconstrained face identification significantly differs from facial attribute recognition. The unsupervised learning case is considered, where facial images from a gallery set should be assigned to one of C>1 individuals (identities). The number of individuals C is generally unknown. The size R of a training sample is usually rather small to train a complex classifier (e.g. a deep CNN) from scratch. Hence, domain adaptation can be applied [7]: each image is described with a feature vector using the deep CNN. In order to obtain this vector, the CNN has been preliminarily trained for the supervised face identification from a large dataset, e.g. CASIA-WebFace, VGG-Face/VGGFace2, or MS-Celeb-1M. By feeding each r-th gallery image (r=1, 2, . . . , R) as the input of this CNN, L2-normalized outputs at one of the last layers are used as a D-dimensional feature vector $x_r=[x_{r,1}, \ldots, x_{r,D}]$ of this r-th image. Finally, any appropriate clustering method, i.e. hierarchical agglomerative clustering [15], can be used to make a final decision for these feature vectors.

In most research studies, each of the abovementioned tasks is solved by a respective independent CNN, even though it is necessary to solve all of said tasks. As a result, processing of each facial image becomes time-consuming, especially for offline mobile applications. The disclosure enables to solve all these tasks by the same CNN. In particular, the inventors assume that the features extracted during face identification can be rather rich for any facial analysis. For example, it has been shown that the VGGFace features [16] can be used to increase accuracy of visual emotion recognition [17, 18]. Keeping in mind that the main requirement is usability of the desired CNN on mobile platforms, the inventors provide a straightforward modification of a CNN with low inference and memory complexity (e.g. MobileNet v1/v2 [12]) which is referred to herein as a basic CNN. This aspect is disclosed below with reference to FIG. 1.

FIG. 1 is a view schematically depicting a multi-output convolutional neural network suitable for simultaneous recognition of facial attributes and identity according to an embodiment of the disclosure.

First layers of the inventive network, which are constituted by the basic CNN preliminarily trained on the ImageNet data, extract representations suitable for face identification. These representations are transformed in at least one hidden dense (fully-connected) layer, which is the penultimate layer of the inventive network, in order to build more powerful facial attributes classifiers. A special regularization-with-dropout layer is added after each hidden fully-connected layer to prevent overfitting to the training set and improve the generalization capability of the neural network model. For each predicted facial attribute, a separate output fully-connected layer is added with an appropriate nonlinear activation function, e.g. softmax for multi-class classification (age prediction, emotion and race recognition) or binary classification for gender. Experiments have shown that at least one new hidden layer with dropout regularization after extraction of identity features slightly improves accuracy of facial attribute recognition.

The learning of the model is performed incrementally. At first, the basic CNN is trained for face identification using a very large dataset, e.g. VGGFace2 with 3M photos of 10K individuals [13]. Next, the last classification layer is removed, and weights of the basic CNN are frozen. Finally, the remaining last layers are learned for recognizing facial attributes. The training photos are not required to have all the attributes available, since, according to the disclosure, the facial attribute recognition tasks are alternately trained by using batches of different training images and available datasets. As age groups in the IMDB-Wiki dataset [6] are very imbalanced, the trained models may work incorrectly for faces of very young or old people. Hence, the embodiment of the disclosure provides for adding all (15K) images from the Adience [5] dataset. Since said dataset contains only age intervals, e.g. "(0-2)", "(60-100)", all images from such an interval are attributed to the middle age, e.g. "1" or "80", respectively.

It is necessary to emphasize that not all images in the IMDB-Wiki include information about both age and gender. Moreover, gender is sometimes unknown in the Adience data. As a result, the number of faces having both age and gender information is several times less as compared to the total number of facial images. Finally, gender data for different ages is also very imbalanced. Thus, the inventors suggest training all heads (outputs) of the CNN (see FIG. 1) independently, using different training data for age and gender classification. In particular, the disclosure provides for alternating mini-batches with age, gender, race, and emotions labels, so that only the respective part of the network is accordingly trained: i.e. weights of the fully-connected layer associated with the age output of the model are not updated for a mini-batch with gender information.

The approach discussed above is further illustrated with reference to FIG. 2.

Figure 2:
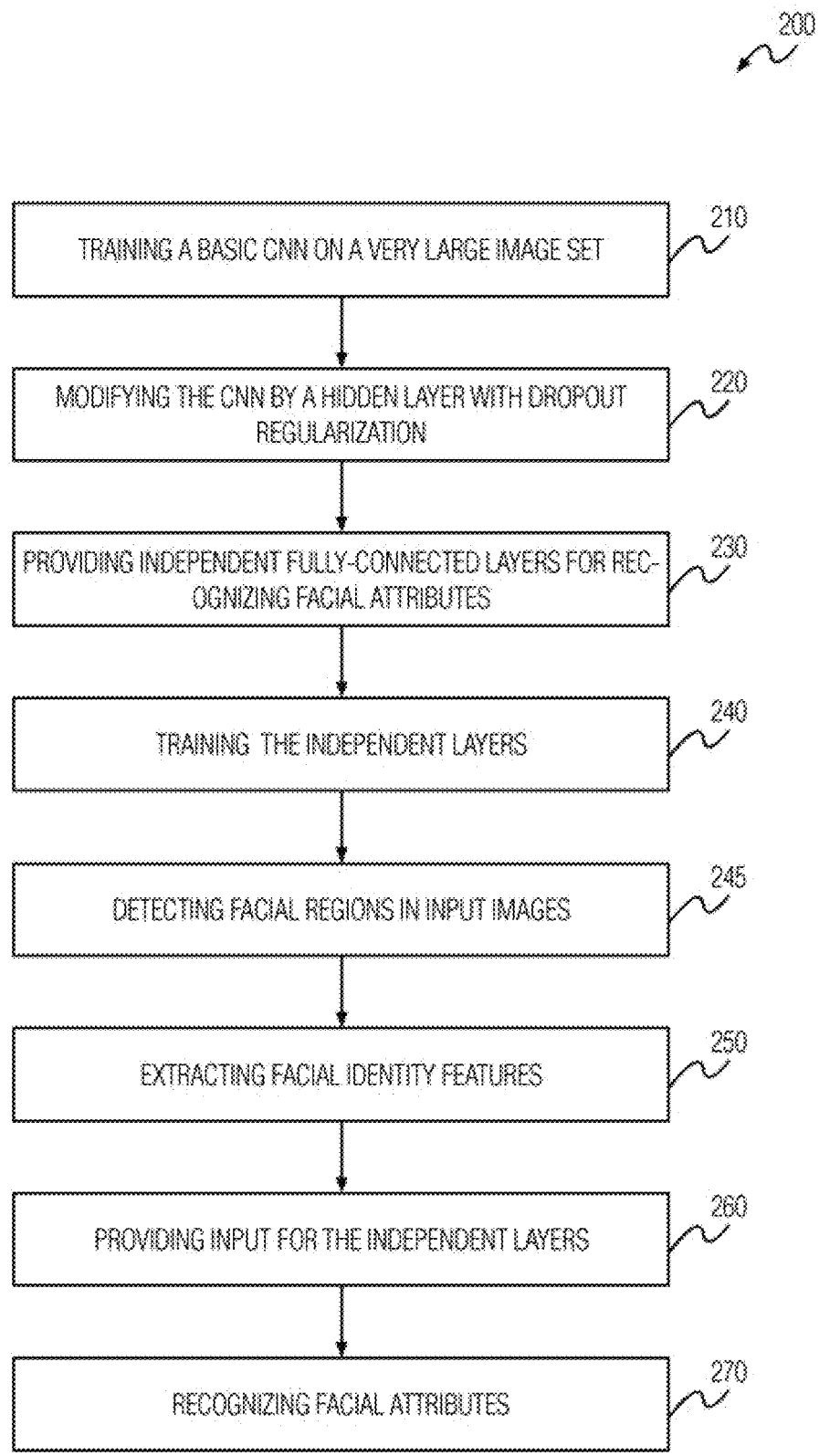
FIG. 2 is a flowchart schematically depicting the method of simultaneously recognizing facial attributes and identity in digital images according to an embodiment of the disclosure.

FIG. 2 is a flowchart schematically depicting the method (200) for simultaneously recognizing facial attributes (i.e.

one or more of age, gender, race or ethnicity, or emotions) and identity in digital images according to an embodiment the disclosure.

In operation 210, a basic CNN is trained on a pre-existing very large set of images. As stated above, the basic CNN is preferably a CNN with low inference and memory complexity, e.g. MobileNet v1/v2.

In operation 220, the CNN is modified by providing at least one hidden layer with dropout regularization over layers of the basic CNN.

Thereafter, in operation 230, independent fully-connected layers for recognizing facial attributes are provided over the at least one hidden layer. Each one of these independent layers corresponds to a respective one of the facial attributes and has a respective nonlinearity.

In operation 240, these independent fully-connected layers are trained. In said training, comprising a batch of training data, which is specific only to one of the independent layers that is being currently trained, is used alternately. It should be emphasized at this point that each batch of training data may have a respective label indicative of a particular facial attribute which said batch is specific to.

Then, one or more input images are provided to the input of the modified and trained CNN.

In operation 250, the layers of the basic CNN extract, from at least parts of the input images, facial identity features suitable for face identification.

Operation 250 is typically preceded by operation 245 where regions associated with faces are detected in the input images, for example, by the multi-task cascaded convolutional neural network (MTCNN) detector, and those regions are then used the as the abovementioned parts of the input images.

In operation 260, the hidden layer of the CNN provides, by using the extracted facial identity features, input for the independent fully-connected layers.

Finally, in operation 270, the facial attributes are respectively recognized by the independent fully-connected layers based on the input from the hidden layer.

The CNN according to the disclosure has the following advantages. First of all, it is highly efficient, since it enables both to use a CNN with high inference speed and low memory complexity (e.g. the MobileNet base) as a basic CNN and to simultaneously solve all the above mentioned tasks of recognizing age, gender, ethnicity, emotions, and identity, without a need to implement inferences in several different networks. Second, in contrast to publicly available datasets typically used for the tasks of recognizing facial attributes, which are rather small and dirty, the inventive model employs the potential of very large and clean face identification datasets to learn very good face representations. Moreover, the hidden layer between the identity features and the outputs further combines the knowledge necessary to predict the facial attributes. As a result, the model enables to improve accuracy of face attribute recognition as compared to the models that rely on training only on specific datasets.

Proposed Pipeline for Organizing Photo and Video Albums

Figure 3:
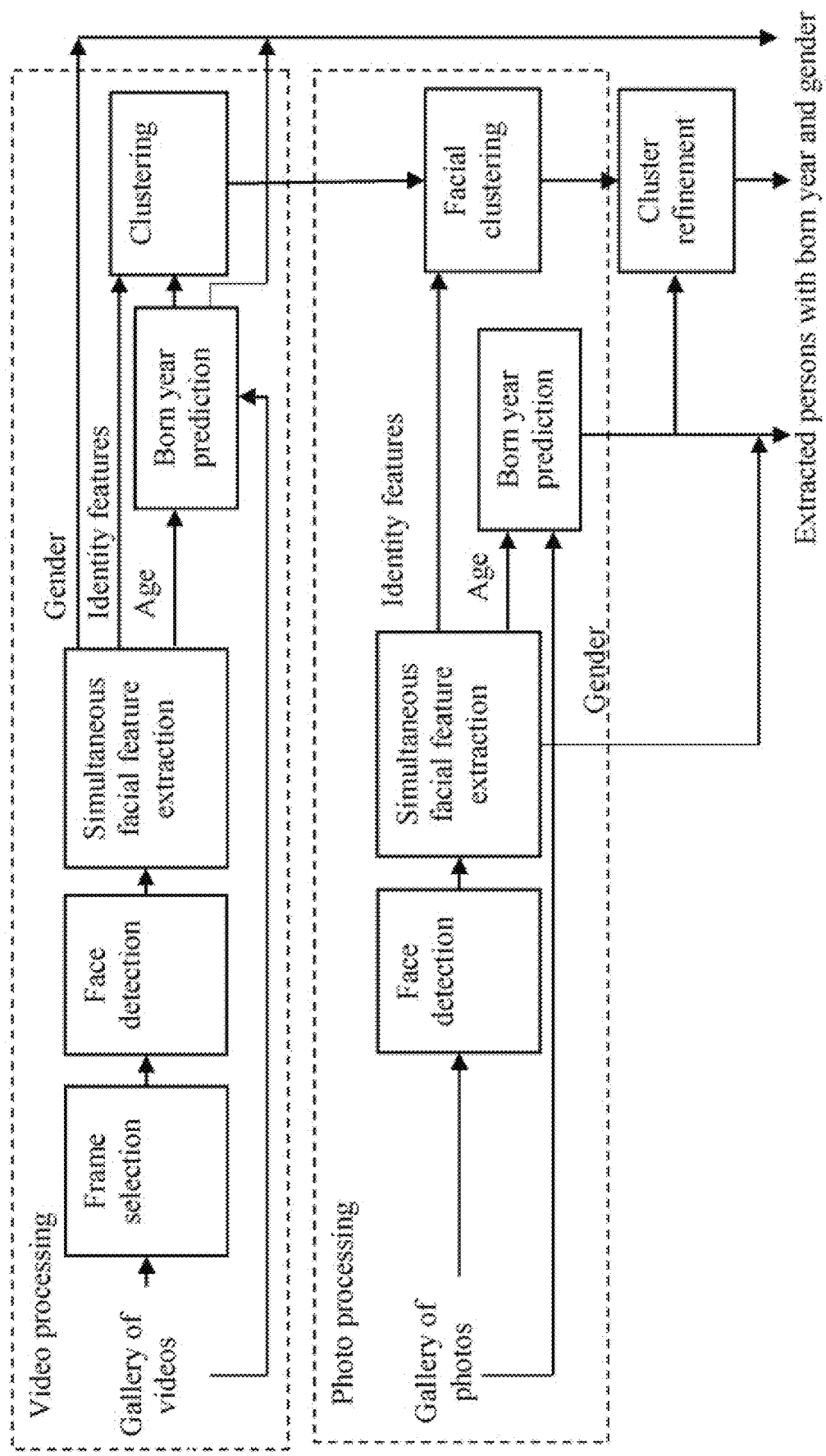
FIG. 3 is a block diagram schematically depicting the overall dataflow of operating the CNN for organizing albums with photos and videos according to an embodiment of the disclosure.

FIG. 3 illustrates the overall data flow of operating the CNN (see FIGS. 1 and 2) for organizing albums with photos and videos according to an embodiment of the disclosure.

According to the embodiment of the disclosure, faces are detected in each photo by using, for example, the MTCNN detector. Next, an inference in the CNN according to the disclosure is performed with respect to all the detected faces $X_r$ in order to extract D identity features and predict facial attributes (e.g. age and gender). After that, all the obtained facial identity feature vectors are clustered. As the number of individuals in the photo albums is usually unknown, hierarchical agglomerative clustering [15] is used to this end. Only rather large clusters with a minimal number of faces are maintained during refinement of the clusters. Gender, emotion, race, and year of birth of a person in each cluster are estimated by appropriate fusion techniques, e.g. the simple voting or maximizing average posterior probabilities at the outputs of the CNN (see FIG. 1). For example, the product rule [19] can be applied if independence of all facial images $X_r$, $r \in \{r_1, \ldots, r_M\}$ in a cluster is naively assumed:

Equation 1

$$\max_{n \in \{1,\ldots,N\}} \prod_{m=1}^{M} p_n(X_{r_m}) = \max_{n \in \{1,\ldots,N\}} \sum_{m=1}^{M} \log p_n(X_{r_m}), \quad (1)$$

where N is the total number of classes, and $p_n(X_{r_m})$ is the n-th output of the CNN for the input image $X_{r_m}$.

The same procedure is repeated for all video files. Only each of, for instance, 3 to 5 frames is selected in each video clip, identity features of all the detected faces are extracted, and only faces found in this clip are initially clustered.

Thereafter, normalized average of the identity features of all the clusters [2] is computed and added to the dataset $\{X_r\}$ so that both the features of all the photos and the average feature vectors of individuals identified in all the videos are handled Jointly.

Nevertheless, age prediction by merely maximizing output data from a respective output(s) of the CNN is not accurate due to the imbalance of the training set. Addition of the Audience data leads to the decision in favor of one of the majority class. Hence, the inventors suggest aggregating the output data $\{p_a(X_r)\}$ of the outputs of the age posteriors. However, as discovered from experiments, the fusion of all the outputs is again insufficiently accurate, because the majority of individuals in the training set are 20-40 years old. Thus, it is proposed to choose only $L \in \{1, 2, \ldots, 100\}$ indices $\{a_1, \ldots, a_L\}$ of maximal outputs and compute expected mean $\bar{a}(X_r)$ for each facial image $X_r$ in the gallery by using normalized top outputs as follows:

Equation 2

$$\bar{a}(X_r) = \frac{\sum_{l=1}^{L} a_l \cdot p_{a_l}(X_r)}{\sum_{l=1}^{L} p_{a_l}(X_r)}. \quad (2)$$

Then, year of birth associated with each face is estimated by subtracting the predicted age from the creation date of a respective image file. In such case, it becomes possible to organize very large albums gathered over years. In addition, the predicted year of birth is used as an additional feature with a special weight in analyzing clusters in order to partially overcome the known similarity of young babies in a family.

Finally, several tricks are implemented in the cluster refinement block (see FIG. 3). At first, different faces present in the same photo are specially marked. As such faces must be stored in different groups, complete linkage clustering of every facial cluster is additionally performed. The distance matrix is specially designed in such a way that distances between the faces in the same photo are set to the maximum value which is much greater than the threshold applied when forming flat clusters. Moreover, the most important clusters should not contain photos/videos made in one day. Hence, a certain threshold is set for a number of days between the earliest and the eldest photo in a cluster, in order to disambiguate a large number of faces out of interest.

The approach discussed above is further illustrated with reference to FIG. 4.

Figure 4:
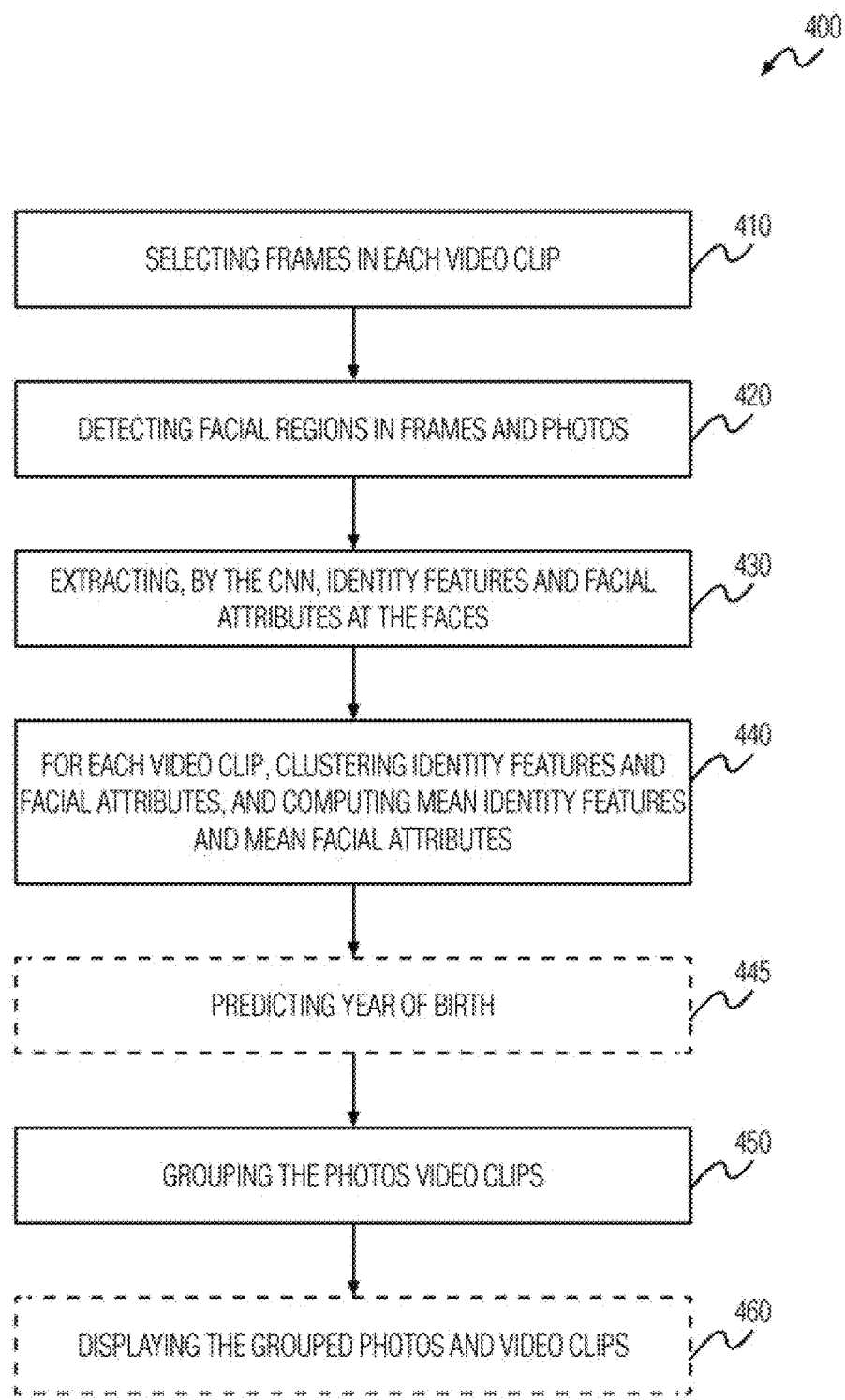
FIG. 4 is a flowchart schematically depicting the method of organizing a digital photo album and/or a digital video album according to an embodiment of the disclosure.

FIG. 4 is a flowchart 400 schematically depicting the method for organizing a digital photo album and/or a digital video album according to an embodiment of the disclosure.

In operation 410, several frames are selected in each video clip from a plurality of video clips included by the video album. Distinct frames of the video clip with fixed frame rate are preferably selected in operation 410.

In operation 420, regions associated with faces are detected in each of the frames selected in operation 410 and/or in each photo from a plurality of photos included by the photo album. This operation can be performed by some multi-view cascade classifier or by the MTCNN detector.

In operation 430, the detected regions are used as input images for the CNN according to the disclosure (see FIG. 1), and said CNN extracts facial identity features and facial attributes of all the faces by executing the respective method according to the disclosure (see FIG. 2).

Then, for each video clip in the respective album, operation 440 clusters extracted facial identity features and facial attributes associated with each face among faces detected in said video clip into a single cluster. Thereafter, mean facial identity features and mean facial attributes are computed for each cluster of the video clip in operation 440. The mean identity features may be obtained by computing a normalized average of the extracted identity features.

In operation 450, the photos and/or the video clips are grouped by jointly clustering the facial identity features extracted from the photos and the mean facial identity features computed for the video clips, and based on at least one averaged facial attribute computed, for each cluster, from respective facial attributes and/or mean facial attributes associated with the cluster. The averaged facial attributes can be computed by using an appropriate fusion technique, for example, the simple voting or maximizing average posterior probabilities at the outputs of the CNN. Said joint clustering is preferably performed by using hierarchical agglomerative clustering to obtain clusters each including facial identity features of one or more faces.

Operation 450 may include a sub-operation (not shown in FIG. 4) where the clusters are refined to filter out inappropriate clusters. The inappropriate clusters may refer, for instance, to clusters with a number of elements less than some predetermined threshold value, or clusters associated with photos/video clips whose capturing dates differ less than another predetermined threshold value.

Operation 450 may be preceded by operation 445 where year of birth of each of the faces is estimated by subtracting age in facial attributes associated with the face from the creation date of a photo/video file in which said face has been detected. In such a case, operation 450 may further comprise preventing facial identity features of persons, whose years of birth differ more than some predefined threshold, from being clustered into the same cluster.

The method may further include operation 460 where the grouped photos and/or video clips, along with respective averaged facial attributes, are accordingly displayed via a display unit of a respective user device.

Figure 5A:
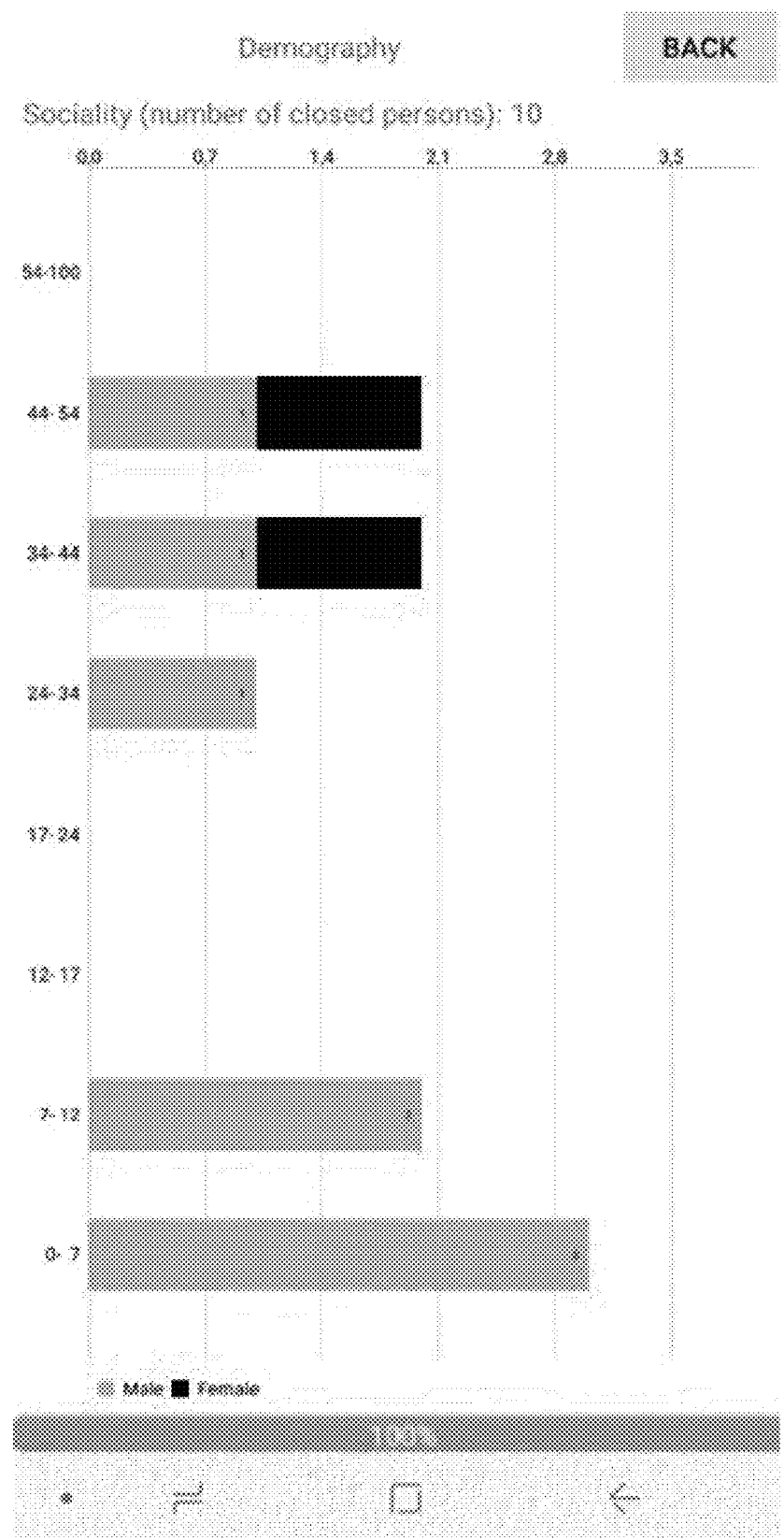
FIGS. 5A, 5B, and 5C are views of partial implementation of the technique in a mobile application according to various embodiments of the disclosure.
Figure 5B:
Figure 5B:
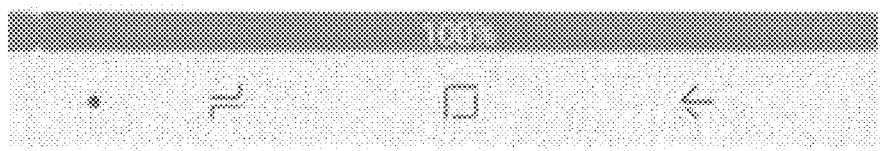
Figure 5C:
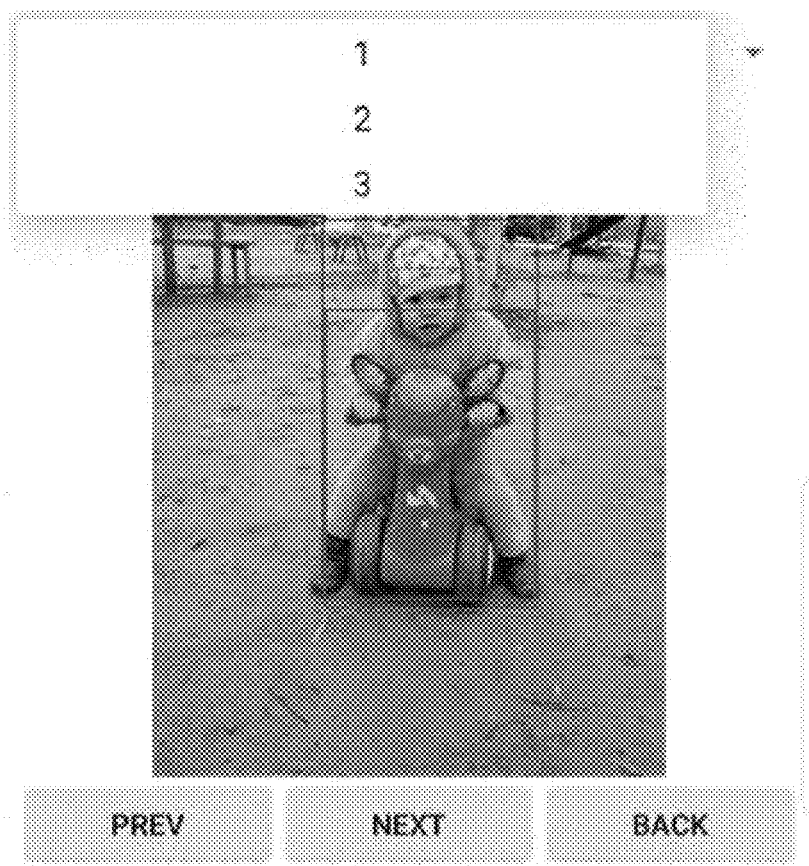

The approach described above with reference to FIGS. 1 to 4 is preferably implemented in a special mobile application for Android (FIGS. 5A, 5B, and 5C).

FIGS. 5A, 5B, and 5C are views of partial implementation of the technique in a mobile application according to various embodiments of the disclosure.

The application may operate in offline mode and does not require Internet connections. This application sequentially processes all photos from the gallery in a background thread. The demography pane provides stacked histograms (see FIG. 5A) of facial attributes of family members and friends who are present in at least 3 photos from the gallery. Tapping on each black or grey bar within the horizontal stacked histogram in FIG. 5A causes the list of all photos of a particular individual to be displayed (see FIG. 5B). It is important to emphasize at this point that entire photos rather than just faces extracted therefrom are preferably presented in the display form of the application, so that photos with several persons can be exposed in said form. If there are plural individuals with an identical gender and age range, then a spinner can be provided on top of the display form, and said spinner is usable to select a particular person by an associated sequential number (see FIG. 3).

Figure 6:
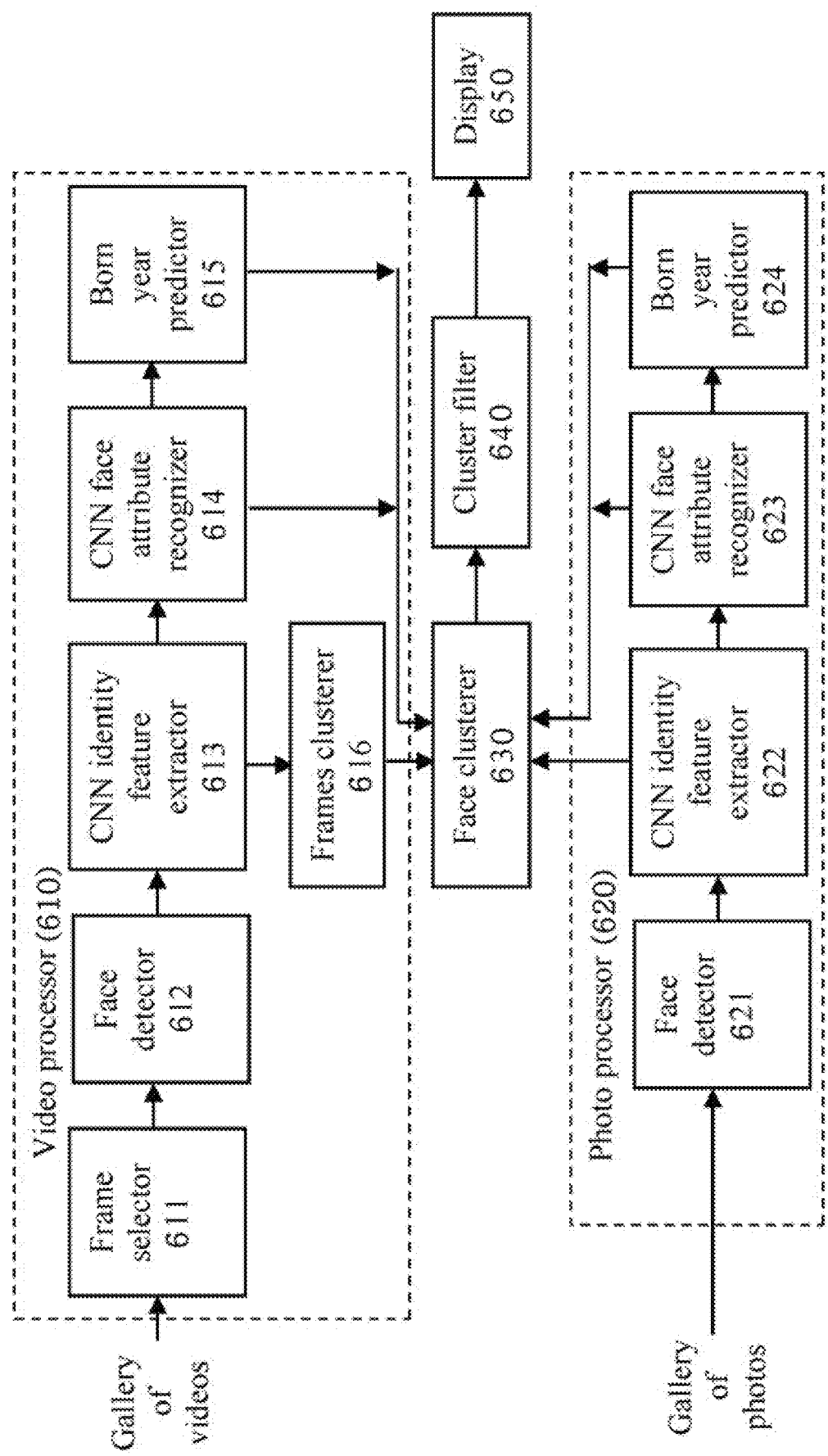
FIG. 6 is a high-level block diagram of an embodiment of a user device capable of performing the operations according to an embodiment of the disclosure.

FIG. 6 is a high-level block diagram of an embodiment of a user device capable of performing the operations according to an embodiment of the disclosure.

FIG. 6 illustrates user device 600 where the embodiments of the disclosure described above can be implemented. The user device includes at least: video processor 610, photo processor 620, face clusterer 630, cluster filter 640, and display 650.

Video processor 610 includes frame selector 611, face detector 612, CNN-based identity feature extractor 613, CNN-based face attribute recognizer 614, year of birth (YoB) predictor 615, and frame clusterer 616. Photo processor 620 includes face detector 621, CNN-based identity feature extractor 622, CNN-based face attribute recognizer 623, and YoB predictor 624. The above-described components of the user device may be connected as illustrated in FIG. 6. It should be appreciated that, although video processor 610 and photo processor 622 are illustrated in FIG. 6 as each including separate face detectors 612 and 621, separate CNN-based identity feature extractors 613 and 622, separate CNN-based face attribute recognizers 614 and 623, separate YoB predictors 615 and 624, in other embodiments of user device 600 video processor 610 and photo processor 620 may advantageously share the same CNN-based identity feature extractor and face attribute recognizer, YoB predictor, and face detector. Moreover, the user device may not include some of the illustrated components or may include additional components to facilitate execution of the operations of the disclosed methods.

Operation of user device 600 is now described. A gallery of the user's video files is inputted to frame selector 611 that is configured to extract high-quality frames. Face detector 612 is configured to detect bounding boxes of facial regions in the selected video frames. CNN-based identity feature extractor 613 and CNN-based face attribute recognizer 614 are configured to perform inferences in the CNN according to the disclosure (see FIG. 1) in order to simultaneously extract face identity features and at least some of such facial attributes as age, gender, ethnicity, and emotions (see FIG. 2). YoB predictor 615 is configured to compute years of birth associated with the extracted faces given modification dates of respective video files and predicted ages. Frame clusterer 616 is configured to unite identical faces found in different frames of the same video clip.

Now the part of user device 600 that is responsible for processing photos from the gallery is described. All the photos are inputted to face detector 621. Face detector 621 is configured to detect a facial region(s) in a captured image and resize the facial region(s). CNN-based identity feature extractor 622 and CNN-based face attribute recognizer 623 are configured to perform inferences in the CNN according to the disclosure (see FIG. 1). YoB predictor 624 is configured to estimate years of birth associated with the extracted faces.

Next, the rest part of user device 600 that is responsible for demography analysis is described. Face clusterer 630 is configured to group facial identity features obtained at the outputs of frame clusterer 616 and CNN-based identity feature extractor 622. Face clusterer 630 may be configured to additionally use the extracted facial attributes in order to prevent individuals with significantly different predictions of year of birth from being united by using the outputs of YoB predictors 615, 624. Cluster filter 640 is configured to filter out inappropriate clusters, e.g. clusters with little number of elements or clusters with photos/videos made in one day. The resultant groups of persons and their attributes may be sent to display 650 for providing the user with desired visual output (see FIG. 5, for example). On the other hand, said groups and associated attributes may be provided to a special processing unit (not shown) of user device 600 that is configured to take a decision on allowability of further interactions between the user and the user device based on results of the recognitions with respect to the user, and, based on the decision, either grant the user with the permission for the interactions or deny them.

As seen from the above discussion, the components of user device 600 substantially perform the methods according to the disclosure, as discussed with reference to FIGS. 1 to 4.

The user device is an electronic apparatus or a system comprising a plurality of electronic apparatuses.

The user device is, according to various embodiments of the disclosure, may be any one of a smartphone, a tablet Personal Computer (PC), an e-book reader, a desktop PC, a laptop PC, a netbook computer, a Personal Digital Assistant (PDA), a digital camera, or a wearable electronic device (e.g. Head-Mounted Display (HMD), electronic glasses, or a smartwatch).

The user device may include a memory storing the CNN and a processor which perform various operations/functions regarding the CNN as disclosed in the disclosure.

The components described with reference to FIG. 6 can be implemented in software stored in one or more computer-readable storage medium within the user computing device and executable by one or more processing units (Central Processing Units (CPUs), etc.) included thereby to implement the structures and perform the operations according to the disclosure, as discussed above with reference to FIGS. 1 to 4, and 5A to 5C. It should be appreciated that the user device may further include other broadly known hardware, software or firmware components.

Experimental Results for Facial Clustering

This subsection presents experimental studies of the proposed system (see FIGS. 1 and 3) in the facial clustering tasks for images gathered in unconstrained environments. Identity features extracted by the basic MobileNet (see FIG. 1) are compared to publicly available CNNs suitable for face recognition, in particular, VGGFace (VGGNet-16) [16] and VGGFace2 (ResNet-50) [13]. VGGFace, VGGFace2, and MobileNet extract D=4096, D=2048 and D=1024 non-negative features in the output of the "fc7", "pool5_7×7_s1", and "reshape_1/Mean" layers from 224×224 RGB images, respectively.

All hierarchical clustering methods from SciPy library are used with Euclidean ($L_2$) distance between feature vectors. Since the centroid and the Ward's linkage have shown very poor performance in all cases, results are reported only for the single, average, complete, weighted, and median linkage methods. In addition, the inventors have implemented rank-order clustering [20] which has been specially developed for organizing faces in photo albums. Parameters of all clustering methods have been tuned using 10% of each dataset. The following clustering metrics are estimated with the scikit-learn library: ARI (Adjusted Rand Index), AMI (Adjusted Mutual Information), homogeneity and completeness. In addition, the average number of extracted clusters K relative to the number of individuals C and the BCubed F-measure are estimated. The latter metric is widely applied in various tasks of grouping faces [4, 21].

The following testing data has been used when testing the disclosure.

A subset of the LFW (Labeled Faces in the Wild) dataset [22] involved into the face identification protocol [23]. C=596 individuals who have at least two images in the LFW database and at least one video in the YTF (YouTube Faces) database (individuals in YTF are a subset of those in LFW) are used in all clustering methods.

the Gallagher Collection Person Dataset [24] which contains 931 labeled faces with C=32 identities in each of 589 images. As only positions of eyes are available in this dataset, faces are preliminarily detected using MTCNN [14], and an individual with the largest intersection of his/her facial region with a given eyes region is selected. If the face is not detected, a square region is extracted with having the size chosen as a 1.5-times distance between eyes.

Grouping Faces in the Wild (GFW) [4] with preliminarily detected facial images from 60 real users' albums from the Chinese social network portal. The size of an album varies from 120 to 3600 faces, with a maximum number of identities C=321.

Average values of clustering performance metrics are presented in Table 1, Table 2, and Table 3 for LFW, Gallagher, and GFW datasets, respectively.

The average linkage is the best method according to most of metrics of cluster analysis. The usage of the rank-order distance [20] is not appropriate due to rather low performance. Moreover, this distance requires an additional threshold parameter for the cluster-level rank-order distance. Finally, computational complexity of such clustering is 3-4 times lower as compared to other hierarchical agglomerative clustering methods. One of the most important conclusions at this point is that the trained MobileNet (see FIG. 1) is in most cases more accurate than the widely-used VGGFace. As expected, quality of the model provided herein is slightly lower as compared to the deep ResNet-50 CNN trained on the same VGGFace2 dataset.

TABLE 1

Clustering Results, LFW subset (C = 596 individuals)

|  |  | K/C | ARI | AMI | Homogeneity | Completeness | F-measure |
|---|---|---|---|---|---|---|---|
| Single | VGGFace | 1.85 | 0.884 | 0.862 | 0.966 | 0.939 | 0.860 |
|  | VGGFace2 | 1.22 | 0.993 | 0.969 | 0.995 | 0.986 | 0.967 |
|  | results | 2.00 | 0.983 | 0.851 | 0.998 | 0.935 | 0.880 |
| Average | VGGFace | 1.17 | 0.980 | 0.937 | 0.985 | 0.971 | 0.950 |
|  | VGGFace2 | 1.06 | 0.997 | 0.987 | 0.998 | 0.994 | 0.987 |
|  | results | 1.11 | 0.995 | 0.971 | 0.993 | 0.987 | 0.966 |
| Complete | VGGFace | 0.88 | 0.616 | 0.848 | 0.962 | 0.929 | 0.823 |
|  | VGGFace2 | 0.91 | 0.760 | 0.952 | 0.986 | 0.978 | 0.932 |
|  | results | 0.81 | 0.987 | 0.929 | 0.966 | 0.986 | 0.916 |
| Weighted | VGGFace | 1.08 | 0.938 | 0.928 | 0.979 | 0.967 | 0.915 |
|  | VGGFace2 | 1.08 | 0.997 | 0.982 | 0.998 | 0.992 | 0.983 |
|  | results | 1.08 | 0.969 | 0.959 | 0.990 | 0.981 | 0.986 |
| Median | VGGFace | 2.84 | 0.827 | 0.674 | 0.987 | 0.864 | 0.751 |
|  | VGGFace2 | 1.42 | 0.988 | 0.938 | 0.997 | 0.972 | 0.947 |
|  | results | 2.73 | 0.932 | 0.724 | 0.999 | 0.884 | 0.791 |
| Rank-Order | VGGFace | 0.84 | 0.786 | 0.812 | 0.955 | 0.915 | 0.842 |
|  | VGGFace2 | 0.98 | 0.712 | 0.791 | 0.989 | 0.907 | 0.888 |
|  | results | 0.86 | 0.766 | 0.810 | 0.962 | 0.915 | 0.863 |

TABLE 2

Clustering Results, Gallagher dataset (C = 32 individuals)

|  |  | K/C | ARI | AMI | Homogeneity | Completeness | F-measure |
|---|---|---|---|---|---|---|---|
| Single | VGGFace | 9.13 | 0.601 | 0.435 | 0.966 | 0.555 | 0.662 |
|  | VGGFace2 | 2.75 | 0.270 | 0.488 | 0.554 | 0.778 | 0.637 |
|  | results | 12.84 | 0.398 | 0.298 | 1.000 | 0.463 | 0.482 |
| Average | VGGFace | 1.84 | 0.858 | 0.792 | 0.916 | 0.817 | 0.874 |
|  | VGGFace2 | 2.94 | 0.845 | 0.742 | 0.969 | 0.778 | 0.869 |
|  | results | 2.03 | 0.890 | 0.809 | 0.962 | 0.832 | 0.897 |
| Complete | VGGFace | 1.31 | 0.571 | 0.624 | 0.886 | 0.663 | 0.706 |
|  | VGGFace2 | 0.94 | 0.816 | 0.855 | 0.890 | 0.869 | 0.868 |
|  | results | 1.47 | 0.644 | 0.649 | 0.921 | 0.687 | 0.719 |
| Weighted | VGGFace | 0.97 | 0.782 | 0.775 | 0.795 | 0.839 | 0.838 |
|  | VGGFace2 | 1.63 | 0.607 | 0.730 | 0.876 | 0.760 | 0.763 |
|  | results | 1.88 | 0.676 | 0.701 | 0.952 | 0.735 | 0.774 |
| Median | VGGFace | 9.16 | 0.613 | 0.433 | 0.942 | 0.555 | 0.663 |
|  | VGGFace2 | 4.41 | 0.844 | 0.715 | 0.948 | 0.761 | 0.860 |
|  | results | 12.38 | 0.439 | 0.324 | 0.960 | 0.482 | 0.531 |
| Rank-Order | VGGFace | 1.59 | 0.616 | 0.488 | 0.902 | 0.582 | 0.702 |
|  | VGGFace2 | 1.94 | 0.605 | 0.463 | 0.961 | 0.566 | 0.682 |
|  | results | 3.06 | 0.249 | 0.251 | 0.986 | 0.424 | 0.398 |

TABLE 3

Clustering Results, GFW dataset (in average, C = 46 individuals)

|  |  | K/C | ARI | AMI | Homogeneity | Completeness | F-measure |
|---|---|---|---|---|---|---|---|
| Single | VGGFace | 4.10 | 0.440 | 0.419 | 0.912 | 0.647 | 0.616 |
|  | VGGFace2 | 3.21 | 0.580 | 0.544 | 0.942 | 0.709 | 0.707 |
|  | results | 4.19 | 0.492 | 0.441 | 0.961 | 0.655 | 0.636 |
| Average | VGGFace | 1.42 | 0.565 | 0.632 | 0.860 | 0.751 | 0.713 |
|  | VGGFace2 | 1.59 | 0.603 | 0.663 | 0.934 | 0.761 | 0.746 |
|  | results | 1.59 | 0.609 | 0.658 | 0.917 | 0.762 | 0.751 |
| Complete | VGGFace | 0.95 | 0.376 | 0.553 | 0.811 | 0.690 | 0.595 |
|  | VGGFace2 | 1.44 | 0.392 | 0.570 | 0.916 | 0.696 | 0.641 |
|  | results | 1.28 | 0.381 | 0.564 | 0.886 | 0.693 | 0.626 |
| Weighted | VGGFace | 1.20 | 0.464 | 0.597 | 0.839 | 0.726 | 0.662 |
|  | VGGFace2 | 1.05 | 0.536 | 0.656 | 0.867 | 0.762 | 0.710 |
|  | results | 1.57 | 0.487 | 0.612 | 0.915 | 0.727 | 0.697 |
| Median | VGGFace | 5.30 | 0.309 | 0.307 | 0.929 | 0.587 | 0.516 |
|  | VGGFace2 | 4.20 | 0.412 | 0.422 | 0.929 | 0.639 | 0.742 |
|  | results | 6.86 | 0.220 | 0.222 | 0.994 | 0.552 | 0.411 |

TABLE 3-continued

Clustering Results, GFW dataset (in average, C = 46 individuals)

|  |  | K/C | ARI | AMI | Homogeneity | Completeness | F-measure |
|---|---|---|---|---|---|---|---|
| Rank- | VGGFace | 0.82 | 0.319 | 0.430 | 0.650 | 0.694 | 0.630 |
| Order | VGGFace2 | 1.53 | 0.367 | 0.471 | 0.937 | 0.649 | 0.641 |
|  | results | 1.26 | 0.379 | 0.483 | 0.914 | 0.658 | 0.652 |

Surprisingly, the highest BCubed F-measure for the most complex GFW dataset (0.751) is achieved by the model. This value is slightly higher than the best BCubed F-measure (0.745) reported in the original paper [4]. However, the most important advantages of the model, from the practical point of view, refer to excellent run-time/space complexity. For example, an inference in the model is 5-10 times faster as compared to VGGF ace and VGGFace2. Moreover, dimensionality of a feature vector is 2-4 times lower, thereby leading to faster computation of the distance matrix in the clustering method. In addition, the model enables to simultaneously predict facial attributes of an observed facial image. The next subsection supports this statement.

Experimental Results for Video-Based Facial Attributes Recognition

In this subsection the model according to the disclosure is compared to publicly available CNNs for age/gender prediction:

1. Age_net/gender_net [25] trained on the Adience dataset [5]
2. Deep expectation (DEX) VGG16 network trained on rather large IMDB-Wiki dataset [6]

In addition, two special cases of the MobileNet-based model (see FIG. 1) are studied. First, the model is compressed by using the standard Tensorflow quantization graph transforms. Second, all the layers in the model are fine-tuned for age and gender predictions. Though such tuning obviously reduces accuracy of face identification with identity features at the output of the base MobileNet, it caused increase of validation accuracy by 1% and 2% for gender and age classification, respectively.

The experiments were run on the MacBook 2016 Pro laptop (CPU: 4× Core i7 2.2 GHz, RAM: 16 GB) and two mobile phones, in particular: 1) Honor 6C Pro (CPU: MT6750 4×1 GHz and 4×2.5 GHz, RAM: 3 GB); and 3) Samsung S9+(CPU: 4×2.7 GHz Mongoose M3 and 4×1.8 GHz Cortex-A55, RAM: 6 GB). The size of the model file and average inference time for one facial image are presented in Table 4.

TABLE 4

Performance Analysis of CNNs

|  |  | Average CPU inference time, s | | |
|---|---|---|---|---|
| CNN | Model size, MB | Laptop | Mobile phone 1 | Mobile phone 2 |
| age_net/gender_net | 48.75 | 0.091 | 1.082 | 0.224 |
| DEX | 513.82 | 0.21 | 2.730 | 0.745 |
| suggested MobileNet | 13.48 | 0.021 | 0.354 | 0.069 |
| suggested MobileNet, quantized | 3.41 | 0.019 | 0.388 | 0.061 |

As expected, the MobileNets are several times faster than the deeper convolutional networks and require less memory to store their weights. Though the quantization reduces the model size 4 times, it does not decrease the inference time.

Finally, though the computation time for the laptop is significantly less as compared to the inference in the mobile phones, the more modern models thereof ("Mobile phone 2") have all become more suitable for offline image recognition. In fact, the model according to the disclosure requires only 60 ms to extract facial identity features and predict both age and gender, which enables to run complex analytics of facial albums on the device.

In the next experiments, accuracy of the models in gender recognition and age prediction is compared. The following video datasets have been used:

Eurecom Kinect [26] which contains 9 photos for each of 52 individuals (14 women and 38 men).

the Indian Movie Face database (IMFDB) [27] with 332 video clips of 63 males and 33 females. Only four age categories are available: "Child" (0-15 years old), "Young" (16-35), "Middle" (36-60), and "Old" (60+).

Acted Facial Expressions in the Wild (AFEW) from the EmotiW 2018 (Emotions recognition in the wild) audio-video emotional sub-challenge [28]. It contains 1165 video files. Facial regions are detected with the MTCNN [14].

IARPA Janus Benchmark A (IJB-A) [29] with more than 13000 total frames of 1165 video tracks. Only gender information is available in this dataset.

In video-based gender recognition, gender of each video frame is first classified. Thereafter two simple fusion strategies are utilized, namely, the simple voting and the product rule (1). The obtained accuracies are exposed in Table 5.

TABLE 5

Gender Recognition Accuracy

| CNN | Aggregation | Eurecom Kinect | IMFDB | AFEW | IJB-A |
|---|---|---|---|---|---|
| gender_net | Simple Voting | 0.73 | 0.71 | 0.75 | 0.60 |
|  | Product rule | 0.77 | 0.75 | 0.75 | 0.59 |
| DEX | Simple Voting | 0.84 | 0.81 | 0.80 | 0.81 |
|  | Product rule | 0.84 | 0.88 | 0.81 | 0.82 |
| suggested MobileNet | Simple Voting | 0.94 | 0.98 | 0.93 | 0.95 |
|  | Product rule | 0.93 | 0.99 | 0.93 | 0.96 |
| suggested MobileNet, quantized | Simple Voting | 0.88 | 0.96 | 0.92 | 0.93 |
|  | Product rule | 0.86 | 0.96 | 0.93 | 0.94 |
| suggested MobileNet, fine-tuned | Simple Voting | 0.93 | 0.95 | 0.91 | 0.94 |
|  | Product rule | 0.95 | 0.97 | 0.92 | 0.95 |

First, the models according to the disclosure are much more accurate than the publicly available CNNs. This can be explained by the preliminary training of the basic MobileNet on the face identification task with a very large dataset, thereby facilitating to learn rather good facial representations. Second, the usage of the product rule generally leads to 1-2% decrease of error rate as compared to the simple voting. Third, the fine-tuned version of the model achieves the lowest error rate only for the Kinect dataset and is 1-3% less accurate in other cases. Finally, though the compression of the CNN enables to significantly reduce the model size (see Table 4), it is characterized by up to 7% decrease of recognition rate.

Table 6 presents the last experimental results for age predictions.

TABLE 6

Age Prediction Accuracy

| CNN | Aggregation | Eurecom Kinect | IMFDB | AFEW |
|---|---|---|---|---|
| age_net | Simple Voting | 0.41 | 0.68 | 0.27 |
| | Product Rule | 0.45 | 0.48 | 0.27 |
| | Expected Value | 0.69 | 0.32 | 0.30 |
| DEX | Simple Voting | 0.60 | 0.29 | 0.47 |
| | Product Rule | 0.71 | 0.29 | 0.48 |
| | Expected Value | 0.71 | 0.54 | 0.52 |
| suggested MobileNet | Simple Voting | 0.92 | 0.32 | 0.46 |
| | Product Rule | 0.94 | 0.36 | 0.46 |
| | Expected Value | 0.94 | 0.77 | 0.54 |
| suggested MobileNet, quantized | Simple Voting | 0.86 | 0.34 | 0.44 |
| | Product Rule | 0.88 | 0.36 | 0.46 |
| | Expected Value | 0.85 | 0.58 | 0.50 |
| suggested MobileNet, fine-tuned | Simple Voting | 0.74 | 0.33 | 0.45 |
| | Product Rule | 0.77 | 0.35 | 0.45 |
| | Expected Value | 0.92 | 0.72 | 0.51 |

It is assumed at this point that age is recognized correctly for the Kinect and AFEW datasets (with known age) if the difference between the real and predicted age is not greater than 5 years. The fusion of age predictions of individual video frames is implemented by: 1) the simple voting, 2) maximizing the product of age posterior probabilities (1), and 3) averaging the expected value (3) with selection of L=3 top predictions in each frame.

It can be noticed that the models are again more accurate in substantially all the cases. The DEX models are comparable with the CNNs only for the AFEW dataset. The lowest error rates are obtained for computation of the expected value of age predictions. For example, it is 2% and 8% more accurate than the simple voting for the Kinect and AFEW data. The effect is especially clear for the IMFDB images in which the expected value leads to up to 45% higher recognition rate.

The foregoing descriptions of the embodiments of the disclosure are illustrative, and modifications in configurations and implementations within the scope of the present specification are contemplated. For instance, while the embodiments of the disclosure are generally described with reference to FIGS. 1 to 4, 5A to 5C, and 6, those descriptions are exemplary. Although the subject matter has been disclosed in the language specific to structural features or methodological acts, it should be appreciated that the subject matter defined in the appended claims is not necessarily limited to the specific features or acts described above. Rather, the specific features and acts described above are disclosed as forms of implementing the claims. Also, the disclosure is not limited by the illustrated order of method operations, and the order may be modified by a skilled artisan without creative efforts. Some or all of the method operations may be performed sequentially or concurrently. Certain operations of the methods may be omitted. The scope of the disclosure is accordingly intended to be limited only by the following claims.

Meanwhile, at least some of the above-described processes, operations and functions in the disclosure may be performed through an electronic apparatus including a memory and a processor. In other words, the technical idea of the disclosure includes a controlling method of an electronic apparatus which performs the above various embodiments suggested in this disclosure and the electronic apparatus thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

The following references are referred to in the description above.

1. Manju, A., Valarmathie, P.: Organizing multimedia big data using semantic based video content extraction technique. In: Soft-Computing and Networks Security (ICSNS), 2015 International Conference on, IEEE (2015) 1-4.
2. Sokolova, A. D., Kharchevnikova, A. S., Savchenko, A. V.: Organizing multimedia data in video surveillance systems based on face verification with convolutional neural networks. In: International Conference on Analysis of Images, Social Networks and Texts, Springer (2017) 223-230.
3. Zhang, Y. J., Lu, H.: A hierarchical organization scheme for video data. Pattern Recognition 35(11) (2002) 2381-2387.
4. He, Y., Cao, K., Li, C., Loy, C. C.: Merge or not? Learning to group faces via imitation learning. arXiv preprint arXiv:1707.03986 (2017).
5. Eidinger, E., Enbar, R., Hassner, T.: Age and gender estimation of unfiltered faces. IEEE Transactions on Information Forensics and Security 9(12) (2014) 2170-2179.
6. Rothe, R., Timofte, R., Van Gool, L.: DEX: Deep expectation of apparent age from a single image. In: Proceedings of the IEEE International Conference on Computer Vision Workshops. (2015) 10-15.
7. Goodfellow, I., Bengio, Y., Courville, A.: Deep learning. MIT press (2016).
8. Crosswhite, N., Byrne, J., Stauffer, C., Parkhi, O., Cao, Q., Zisserman, A.: Template adaptation for face verification and identification. In: Automatic Face & Gesture Recognition (FG 2017), 2017 12th IEEE International Conference on, IEEE (2017) 1-8.
9. Wang, F., Cheng, J., Liu, W., Liu, H.: Additive margin softmax for face verification. IEEE Signal Processing Letters 25(7) (2018) 926-930.
10. Savchenko, A. V., Belova, N. S.: Unconstrained face identification using maximum likelihood of distances between deep off-the-shelf features. Expert Systems with Applications 108 (2018) 170-182.
11. Ranjan, R., Patel, V. M., Chellappa, R.: Hyperface: A deep multi-task learning framework for face detection, landmark localization, pose estimation, and gender recognition. IEEE Transactions on Pattern Analysis and Machine Intelligence (2017).
12. Howard, A. G., Zhu, M., Chen, B., Kalenichenko, D., Wang, W., Weyand, T., Andretto, M., Adam, H.: MobileNets: Efficient convolutional neural networks for mobile vision applications. arXiv preprint arXiv:1704.04861 (2017).
13. Cao, Q., Shen, L., Xie, W., Parkhi, O. M., Zisserman, A.: VGGFace2: A dataset for recognising faces across pose and age. In: Automatic Face & Gesture Recognition (FG 2018), 2018 13th IEEE International Conference on, IEEE (2018) 67-74.

14. Zhang, K., Zhang, Z., Li, Z., Qiao, Y.: Joint face detection and alignment using multitask cascaded convolutional networks. IEEE Signal Processing Letters 23(10) (2016) 1499-1503.
15. Aggarwal, C. C., Reddy, C. K.: Data clustering: algorithms and applications. CRC press (2013).
16. Parkhi, O. M., Vedaldi, A., Zisserman, A., et al.: Deep face recognition. In: BMVC. Volume 1. (2015) 6.
17. Kaya, H., Gurpinar, F., Salah, A. A.: Video-based emotion recognition in the wild using deep transfer learning and score fusion. Image and Vision Computing 65 (2017) 66-75.
18. Rassadin, A., Gruzdev, A., Savchenko, A.: Group-level emotion recognition using transfer learning from face identification. In: Proceedings of the 19th ACM International Conference on Multimodal Interaction, ACM (2017) 544-548.
19. Kittler, J., Hatef, M., Duin, R. P., Matas, J.: On combining classifiers. IEEE Transactions on Pattern Analysis and Machine Intelligence 20(3) (1998) 226-239.
20. Zhu, C., Wen, F., Sun, J.: A rank-order distance based clustering algorithm for face tagging. In: Computer Vision and Pattern Recognition (CVPR), 2011 IEEE Conference on, IEEE (2011) 481-488.
21. Zhang, Z., Luo, P., Loy, C. C., Tang, X.: Joint face representation adaptation and clustering in videos. In: European conference on computer vision, Springer (2016) 236-251.
22. Learned-Miller, E., Huang, G. B., Roy Chowdhury, A., Li, H., Hua, G.: Labeled faces in the wild: A survey. In: Advances in face detection and facial image analysis. Springer (2016) 189-248.
23. Best-Rowden, L., Han, H., Otto, C., Klare, B. F., Jain, A. K.: Unconstrained face recognition: Identifying a person of interest from a media collection. IEEE Transactions on Information Forensics and Security 9(12) (2014) 2144-2157.
24. Gallagher, A. C., Chen, T.: Clothing cosegmentation for recognizing people. In: Computer Vision and Pattern Recognition, 2008. CVPR 2008. IEEE Conference on, IEEE (2008) 1-8.
25. Levi, G., Hassner, T.: Age and gender classification using convolutional neural networks. In: Proceedings of the IEEE Conference on Computer Vision and Pattern Recognition Workshops. (2015) 34-42.
26. Min, R., Kose, N., Dugelay, J. L.: Kinectfacedb: A Kinect database for face recognition. IEEE Transactions on Systems, Man, and Cybernetics: Systems 44(11) (2014) 1534-1548.
27. Setty, S., Husain, M., Beham, P., Gudavalli, J., Kandasamy, M., Vaddi, R., Hemadri, V., Karure, J., Raju, R., Rajan, B., et al.: Indian movie face database: a benchmark for face recognition under wide variations. In: Fourth National Conference on Computer Vision, Pattern Recognition, Image Processing and Graphics (NCVPRIPG), IEEE (2013) 1-5.
28. Klare, B. F., Klein, B., Taborsky, E., Blanton, A., Cheney, J., Allen, K., Grother, P., Mah, A., Jain, A. K.: Pushing the frontiers of unconstrained face detection and recognition: Iarpa janus benchmark a. In: Proceedings of the IEEE Conference on Computer Vision and Pattern Recognition. (2015) 1931-1939.
29. Dhall, A., et al.: Collecting large, richly annotated facial-expression databases from movies. IEEE Multimedia (2012).

What is claimed is:

1. A controlling method of an electronic apparatus, the method comprising:
obtaining at least one identity feature regarding an image, by inputting the image to a convolutional neural network (CNN) that is trained to extract an identity feature for identifying a face included in at least one image based on training data including a plurality of images;
inputting the obtained at least one identity feature to at least one hidden layer to which dropout regularization is applied; and
recognizing a facial attribute included in the input image through one or more independent fully-connected layers based on an output of the hidden layer according to an input of the identity feature,
wherein the obtaining further comprises:
obtaining a first plurality of identity features by inputting first image data extracted from video data to the CNN; and
obtaining a second plurality of identity features by inputting second image data to the CNN,
wherein the recognizing further comprises:
recognizing a first plurality of facial attributes included in the first image data; and
recognizing a second plurality of facial attributes included in the second image data, and
wherein the method further comprises:
obtaining first clusters corresponding to each person by clustering the first plurality of identity features and the first plurality of facial attributes;
calculating an average value of each of the first plurality of identity features and the first plurality of facial attributes with respect to each of the first clusters to obtain averaged facial attributes with respect to each of the first clusters;
obtaining second clusters corresponding to each person by jointly clustering the calculated average value of each of the first plurality of identity features and the second plurality of identity features;
calculating an average value of each of the attributes of faces with respect to each of the second clusters to obtain averaged facial attributes with respect to each of the second clusters; and
displaying a first image based on the first clusters along with the averaged facial attributes with respect to each of the first clusters and a second image based on the second clusters along with the averaged facial attributes with respect to each of the second clusters.

2. The method as claimed in claim 1, wherein the facial attribute is at least one of age, gender, race, ethnicity or emotion.

3. The method as claimed in claim 1, further comprising:
training each of the one or more independent fully-connected layers based on different training data,
wherein the each of the one or more independent fully-connected layers corresponds to a different attribute.

4. The method as claimed in claim 1, further comprising:
detecting a region associated with a face from one or more input images; and
extracting the identity feature, through the trained CNN, from the detected region.

5. The method as claimed in claim 4, wherein the detecting of the region is performed by a multi-view cascade classifier or a multi-task cascaded convolutional neural network (MTCNN) detector.

6. The method as claimed in claim 1, further comprising:
detecting regions associated with faces from a plurality of images;

extracting a plurality of identity features from the detected regions;
obtaining clusters corresponding to each person by clustering the plurality of identity features; and
recognizing an attribute of a face of a person corresponding to each of the obtained clusters.

7. The method as claimed in claim 6, wherein the obtaining of the clusters comprises obtaining the clusters using a hierarchical agglomerative clustering (HAS).

8. The method as claimed in claim 1, further comprising:
detecting regions associated with faces from a plurality of images;
extracting a plurality of identity features and attributes of faces from the detected regions;
obtaining clusters corresponding to each person by clustering the plurality of identity features and the attributes; and
calculating an average value of each of the attributes of the faces with respect to each of the obtained clusters.

9. The method as claimed in claim 8, wherein the calculating of the average value of each of the attributes of the faces is performed through simple voting or by maximizing average posterior probabilities in outputs of the CNN.

10. The method as claimed in claim 1, further comprising:
selecting a plurality of frames in each of a plurality of video clips;
detecting regions associated with faces from the selected plurality of frames;
extracting a plurality of identity features and attributes of faces from the detected regions;
detecting regions associated with faces from a plurality of images; and
extracting a plurality of identity features and attributes of faces from the detected regions.

11. The method as claimed in claim 10, wherein the selecting of the plurality of frames comprises selecting different frames of a video clip of a fixed frame rate.

12. An electronic apparatus comprising:
a memory to store a convolutional neural network (CNN) trained to extract an identity feature for identifying a face included in at least one image based on training data including a plurality of images;
a display; and
at least one processor configured to:
obtain at least one identity feature regarding an image by inputting the image to the CNN,
input the obtained at least one identity feature to at least one hidden layer to which dropout regularization is applied, and
recognize a facial attribute included in the input image through one or more independent fully-connected layers based on an output of the hidden layer according to an input of the identity feature,
wherein the obtaining further comprises:
obtaining a first plurality of identity features by inputting first image data extracted from video data to the CNN, and
obtaining a second plurality of identity features by inputting second image data to the CNN,
wherein the recognizing further comprises:
recognizing a first plurality of facial attributes included in the first image data, and
recognizing a second plurality of facial attributes included in the second image data, and wherein the processor is further configured to:
obtain first clusters corresponding to each person by clustering the first plurality of identity features and the first plurality of facial attributes,
calculate an average value of each of the first plurality of identity features and the first plurality of facial attributes with respect to each of the first clusters to obtain averaged facial attributes with respect to each of the first clusters,
obtain second clusters corresponding to each person by jointly clustering the calculated average value of each of the first plurality of identity features and the second plurality of identity features,
calculate an average value of each of the attributes of faces with respect to each of the second clusters to obtain averaged facial attributes with respect to each of the second clusters, and
control the display to display a first image based on the first clusters along with the averaged facial attributes with respect to each of the first clusters and a second image based on the second clusters along with the averaged facial attributes with respect to each of the second clusters.

13. The apparatus as claimed in claim 12, wherein each of the one or more independent fully-connected layers is trained based on different training data corresponding to each of different attributes.

14. The apparatus as claimed in claim 12, wherein the at least one processor is further configured to:
detect a region associated with a face from one or more input images, and
extract the identity feature, through the trained CNN, from the detected region.

15. The apparatus as claimed in claim 14, wherein the at least one processor is further configured to detect the region through a multi-view cascade classifier or a multi-task cascaded convolutional neural network (MTCNN) detector.

16. The apparatus as claimed in claim 12, wherein the at least one processor is further configured to:
detect regions associated with faces from a plurality of images, extracts a plurality of identity features from the detected regions,
obtain clusters corresponding to each person by clustering the plurality of identity features, and
recognize an attribute of a face of a person corresponding to each of the obtained clusters.

17. The apparatus as claimed in claim 16, wherein the at least one processor is further configured to obtain the clusters using a hierarchical agglomerative clustering (HAS).

18. The apparatus as claimed in claim 12, wherein the at least one processor is further configured to:
detect regions associated with faces from a plurality of images, and
extract a plurality of identity features and attributes of faces from the detected regions.

19. The apparatus as claimed in claim 18, wherein the at least one processor is further configured to calculate an average value of each of the attributes of the faces through simple voting or by maximizing average posterior probabilities in outputs of the CNN.

20. The apparatus as claimed in claim 12, wherein the at least one processor is further configured to:
select a plurality of frames in each of a plurality of video clips,
detect regions associated with faces from the selected plurality of frames, extract a plurality of identity features and attributes of faces from the detected regions, detect regions associated with faces from a plurality of images, and extract a plurality of identity features and attributes of faces from the detected regions.

\* \* \* \* \*